(No Model.)
P. VAN E. EGBERT.
THILL COUPLING.
No. 423,420. Patented Mar. 18, 1890.
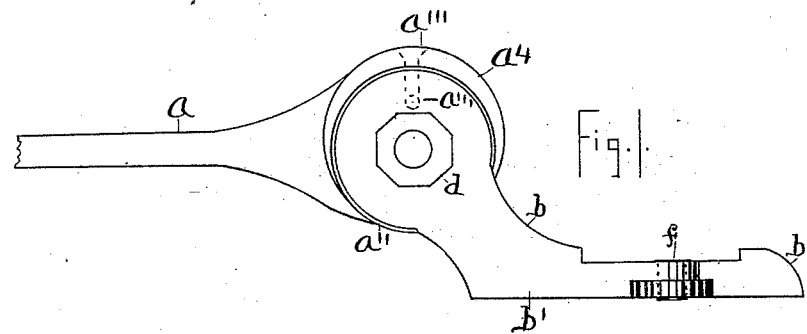
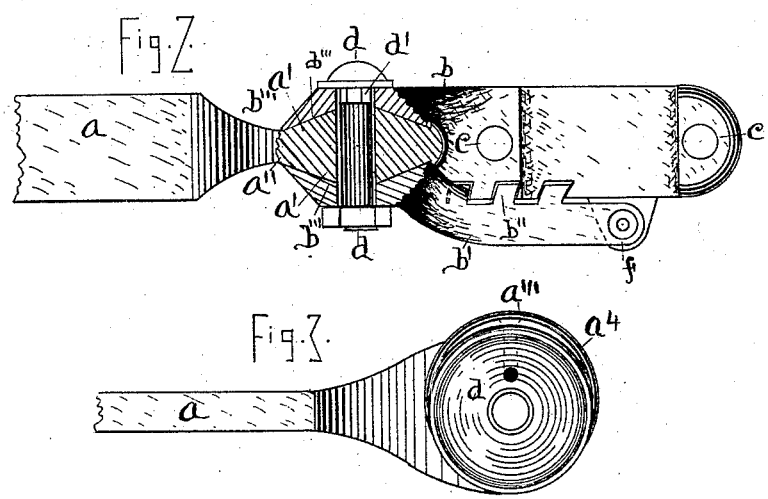
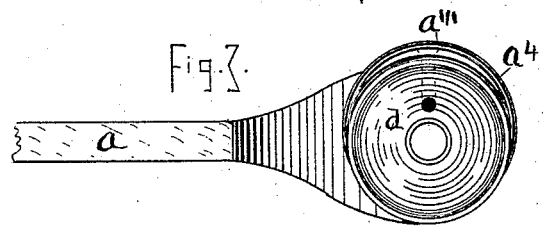
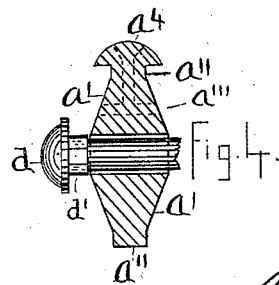
C. M. Egbert
S. J. Parker
Witnesses.
Peter V. E. Egbert
Inventor.

UNITED STATES PATENT OFFICE.

PETER VAN-ESS EGBERT, OF SOUTH LANSING, NEW YORK.

THILL-COUPLING.

SPECIFICATION forming part of Letters Patent No. 423,420, dated March 18, 1890.

Application filed September 5, 1889. Serial No. 323,107. (No model.)

*To all whom it may concern:*

Be it known that I, PETER VAN-ESS EGBERT, a citizen of the United States of America, and a resident of South Lansing, Tompkins county, New York, have invented an Improved Clip for Thills and Poles of Vehicles, of which the following is a specification, reference being had to the accompanying drawings.

My invention relates to making a convenient noiseless clip for thills and poles of vehicles; and it consists of flat disk-shaped bearing-surfaces on one part of the clip and of corresponding concave surfaces in the other part of the clip and of a hinge in connection with said parts; and the nature of my invention will be apparent as I describe it, my clip being also strong and durable.

Figure 1 is a side elevation of my clip closed for use; Fig. 2, a view, partially sectional, of it from above. Fig. 3 is a side view of the thill or pole portion of the clip, and Fig. 4 is a perpendicular sectional view of the thill-iron through the disks and cover.

In the figures, $a$ is the thill or pole part of the clip, and $b$ the axle-tree portion of the clip, the aperture $c$ being for the usual strap by which the clip is attached to the axle, and $d$ is the bolt that secures the two parts of the clip together, and $a'$ $a'$ are two cone-shaped portions whose bearing-surfaces on the corresponding bearing-surfaces of the axle-iron are by the straight lines of the sides of the cones. These are portions struck out by dies as parts of the thill-piece, there being a mid-rib $a''$ between them, and over the mid-rib a cover, made also as a part of the thill-iron, which protects the joint surfaces of the clip. An oil-aperture $a'''$ is made down through this cover and into the mid-rib to near the bolt-aperture, where by a transverse opening it allows the oil to flow out on the surfaces of the disks, thus oiling the joint of the clip. The axle portion of the clip is made of two portions, one $b$, that has been pointed out, and the other $b'$, that is hinged at $f$ to the part $b$, there being teeth whose sides are made on a curve of a radius centering in the joint about the bolt $f$, and which teeth $b''$ fit when the joint is closed into corresponding cavities in the part $b$ for the purpose of resisting the strain on the bolts $d$ and $f$ when the horse in the thills draws forward or back. Concave surfaces $b'''$ are made in the front end of the parts $b$ $b'$, that fit the corresponding surfaces of the disks $a'$, thus making the joint of the clip, as seen in section in Fig. 2.

I make my disks flat cones and not round-faced disks, since rounded disks wear unevenly by there being no central point (as in my cones) to which they are held, and to which the wear tends in a spherical-shaped disk. By the bolt $d$ the joint of the two axle parts of the clip is held together, the said joint being made as described, or in any other convenient manner, in rear of these flat straight-lined surfaced cones, and when thus co-adapted they wear evenly and toward a central point and are durable. The bolt $d$ has a round head, and then the squared portion $d'$ in one part of the axle portion $b$, then a rounded space, and then the usual burr or double burrs on a screw portion of the bolt.

The forms or shapes of the various portions of my clip have been a matter of much close study, and are indicated in their preferred best shape.

By the unloosening of the bolt $d$ the portion $b'$ is turned out from the part $b$ by the hinge $f$, and thus there is the greatest facility of opening the joint and for the change of thills or poles of the vehicle. By the cone-shaped surfaces and the corresponding concave surfaces of the joint there is absolute freedom from all rattling or noise in the joint, which noiselessness has been a matter of great study. The bolt $d$ is indicated to be loose in the joint from the bearing of the portion $a'$ on it, since there need be no such bearing on the bolt, the surfaces just described being effective without such bearing on the bolt, and hence the usual wearing out of the joint-bolt is avoided. As the surfaces of the joint wear, the bolt is tightened, which, as the surfaces are larger than those of the usual clips in use, is very slow.

The disks, as indicated, are very flat, and can be made even flatter than indicated in the drawings, so that my clip is neatly and durably made by very flat cone-shaped disks, that are the surfaces, rather than the bolt, for the draft of the vehicle, and fit so closely into the concave portions that they are noiseless, as has been said.

The teeth shown in Fig. 2 are curved from the central point $f$ of the hinged portion of the clip, and that shape gives a very perfect immunity in the backing-thrust. The forward draft is also rendered secure by the teeth and the hinge and bolt. Three teeth are indicated; but two teeth may be better than many small teeth, or even one large tooth or stud. The hinge about the bolt $f$ may be made of loose pieces that lap on each other, and which act as hinged pieces, suited to open the joint, and that, in accordance to what has been said, are compactly made, yet noiseless, convenient, and durable.

In Fig. 2 the cap or cover is represented as cut away, that the exact size and shapes of the disks may be seen. All parts are drawn of the full size thought desirable for light wagons. The cone-shaped disks are shown in Fig. 2 as conoidal in their bearing-surfaces.

The flattened cone-shaped disks are indicated in Fig. 3 by shaded lines to indicate that they may be curved in outline. All other parts are believed to be apparent.

What I claim in the above-described vehicle-clip is, disclaiming all else—

1. A thill-clip iron $a$, provided with disks $a'$ on its joint end and with an aperture for a bolt enlarged so that it shall not bear on the bolt $d$, in combination with a two-part axle-piece $b$, which parts are hinged to each other, substantially as set forth.

2. A thill-iron $a$, provided with disks $a'$ on each side of the mid-rib between them on its joint end, and with a rounded covering-cap $a'''$, made as a part of the same piece of metal as the disks and mid-rib, and which extends from the rear of the disks to the front of them over the joint, as set forth.

3. The teeth $b''$ of the movable hinged part of the axle-piece, made with sides that fit into the main part of the axle-piece, the sides of both teeth and cavities being made on a curve whose center is the pivot-bolt of the said pieces, as set forth.

4. The thill-iron constructed of the thill-piece $a$, the joint end of which is flattened and made with the disks $a'$ on its sides, provided with the enlarged bolt-aperture through the disks and the mid-rib, and with a cap which covers the joint over the disks also made a part of the thill-iron, in combination with the two-part axle-piece $b$, the joint end of which incloses only the disks of the thill-iron, as shown and described.

5. A thill-iron constructed of a flattened joint end, the disks $a'$, the top cover over the disks, and oil-aperture through the top cover down into the mid-rib, where by transverse apertures it opens on the surfaces of the disks, as set forth.

6. A solid thill-iron $a$, provided with bearing-surfaces made with straight-lined cone-shaped disks on each side of the end of the one stamped or swaged single piece of metal, in combination with a single solid axle-piece $b$, also swaged of one piece of metal and provided with a hinged swaged closing-piece $b'$, hinged in rear of the cone joint, these parts having corresponding surfaces fitting the cones, and the parts of the clip being made, adapted, and arranged to each other as shown and set forth.

PETER VAN-ESS EGBERT.

Witnesses:
SAMUEL J. PARKER,
R. F. PARKER.